United States Patent
Ma et al.

(10) Patent No.: US 12,104,395 B2
(45) Date of Patent: Oct. 1, 2024

(54) COMPOSITE CROSSARM AND POWER TRANSMISSION TOWER

(71) Applicant: JIANGSU SHEMAR ELECTRIC CO., LTD., Nantong (CN)

(72) Inventors: Bin Ma, Nantong (CN); Jie Yu, nantong (CN); Qing Huang, Nantong (CN)

(73) Assignee: JIANGSU SHEMAR ELECTRIC CO., LTD., Nantong (CN)

( * ) Notice: Subject to any disclaimer, the term of this patent is extended or adjusted under 35 U.S.C. 154(b) by 379 days.

(21) Appl. No.: 17/630,813

(22) PCT Filed: Oct. 12, 2021

(86) PCT No.: PCT/CN2021/123301
§ 371 (c)(1),
(2) Date: Jan. 27, 2022

(87) PCT Pub. No.: WO2022/179114
PCT Pub. Date: Sep. 1, 2022

(65) Prior Publication Data
US 2023/0358068 A1    Nov. 9, 2023

(30) Foreign Application Priority Data

Feb. 24, 2021  (CN) .......................... 202110206367.9

(51) Int. Cl.
*H02G 7/20* (2006.01)
*E04H 12/24* (2006.01)
(Continued)

(52) U.S. Cl.
CPC ............. *E04H 12/24* (2013.01); *H01B 17/16* (2013.01); *H02G 7/05* (2013.01); *H02G 7/20* (2013.01); *H02G 15/007* (2013.01)

(58) Field of Classification Search
CPC .......... H02G 7/05; H02G 7/20; H02G 15/007; H02G 7/053; H02G 7/08; H02G 7/12;
(Continued)

(56) References Cited

U.S. PATENT DOCUMENTS 3,264,400 A * 8/1966 Taylor ...................... H02G 7/14
174/148
4,314,434 A * 2/1982 Meisberger ............. E04H 12/24
174/45 R
(Continued)

FOREIGN PATENT DOCUMENTS

CL    202200569 A    9/2022
CN    202899719 U    4/2013
(Continued)

OTHER PUBLICATIONS

Columbian Office Action for corresponding CO Application No. NC20220012757, dated Feb. 9, 2024, 6 pages.
(Continued)

*Primary Examiner* — Angel R Estrada
(74) *Attorney, Agent, or Firm* — Taft Stettinius & Hollister LLP

(57) ABSTRACT

The present disclosure discloses a composite crossarm and a power transmission tower. The composite crossarm includes a post insulator and three suspension insulators. The post insulator and the suspension insulators each has an end configured to be connected to a tower body of the power transmission tower, and another end connected together to form an end of the composite crossarm that is configured to attach a transmission line. The three suspension insulators are arranged at intervals around the post insulator. Axes of two suspension insulators and an axis of the post insulator are in the same plane. The two suspension insulators whose axes are in the same plane as the axis of the post insulator are defined as first suspension insulators, the remaining
(Continued)

suspension insulator is defined as a second suspension insulator. The two first suspension insulators form an angle ranged from 45° to 90°.

11 Claims, 15 Drawing Sheets

(51) Int. Cl.
*H01B 17/16* (2006.01)
*H02G 7/05* (2006.01)
*H02G 15/007* (2006.01)

(58) Field of Classification Search
CPC .......... H02G 7/125; H02G 7/205; H02G 7/00; H02G 7/14; H02G 7/056; H02G 1/12; H02G 7/02; H01H 17/16; E04H 12/24; H01R 4/643; H01R 4/64
USPC ........ 174/158 R, 40 R, 41, 42, 43, 44, 45 R, 174/45 TD, 40 TD; 248/200, 205.1; 52/651.02, 651.03, 40, 697
See application file for complete search history.

(56) References Cited

U.S. PATENT DOCUMENTS

| | | | | |
|---|---|---|---|---|
| 8,785,768 | B2 * | 7/2014 | Li | H02G 13/00 174/2 |
| 8,895,861 | B2 * | 11/2014 | Cotton | H02G 7/053 174/45 R |
| 9,698,585 | B2 | 7/2017 | Ma et al. | |
| 10,205,312 | B2 * | 2/2019 | Ma | E04H 12/24 |
| 11,283,254 | B2 * | 3/2022 | Ma | E04H 12/34 |
| 11,551,835 | B2 * | 1/2023 | Lindsey | H01B 17/04 |
| 2012/0205139 | A1 | 8/2012 | Cotton | |

FOREIGN PATENT DOCUMENTS

| | | |
|---|---|---|
| CN | 103291114 A | 9/2013 |
| CN | 103452370 A | 12/2013 |
| CN | 205046909 U | 2/2016 |
| CN | 106049968 A | 10/2016 |
| CN | 205617888 U | 10/2016 |
| CN | 106448952 A | 2/2017 |
| CN | 106894670 A | 6/2017 |
| CN | 106930594 A | 7/2017 |
| CN | 107762247 A | 3/2018 |
| CN | 209293540 U | 8/2019 |
| CN | 211229726 U | 8/2020 |
| CN | 112282480 A | 1/2021 |
| CN | 212478729 U | 2/2021 |
| CN | 212535268 U | 2/2021 |
| CN | 112878787 A | 6/2021 |
| CO | 92302249 | 5/1989 |
| CO | 20190003947 A1 | 5/2019 |
| JP | H0537611 U | 5/1993 |
| JP | H07308016 A | 11/1995 |
| JP | 2016502832 A | 1/2016 |

OTHER PUBLICATIONS

Canadian Office Action for corresponding CA Application No. 3,145,346, dated Nov. 30, 2023, 6 pages.
International Search Report for corresponding Application No. PCT/CN2021/123301 dated Jan. 2, 2022, 5 pages.
Written Opinion for corresponding Application No. PCT/CN2021/123301 dated Jan. 2, 2022, 5 pages.
European Search Report for corresponding Application No. 21836314.1 dated Jul. 3, 2023, 8 pages.
Chile Office Action for corresponding Application No. 20220613 dated Jun. 12, 2023, 12 pages.
Australian Patent Office, Examination Report issued in corresponding Application No. 2021429765, dated Apr. 11, 2024, 5 pp.
Japanese Patent Office, Notice of Reasons for Refusal issued in corresponding Application No. 2023-547391. dated Jun. 13, 2024, 10 pp.

* cited by examiner

COMPOSITE CROSSARM AND POWER TRANSMISSION TOWER

CROSS REFERENCE TO RELATED APPLICATIONS

This is a U.S. National Stage application of, and claims priority to, PCT/CN2021/123301, filed Oct. 12, 2021, which further claims priority to Chinese Patent Application No. 202110206367.9, filed Feb. 24, 2021, the disclosures of which are incorporated herein by reference in their entirety.

TECHNICAL FIELD

The present disclosure relates to the field of power transmission technology, in particular to a composite crossarm and a power transmission tower.

BACKGROUND

A composite material has advantages of light weight, high strength, corrosion resistance, easy processing, designability and good insulation performance, etc., and thus becomes one of the ideal materials used to make power transmission towers. The towers made of the composite material have advantages of light tower weight, small-sized tower head, lightweight structure, easy processing and forming, low cost in transportation and assembly, corrosion resistance, high and low temperature resistance, high strength, low possibility of theft, and low cost in line maintenance etc.

The inventors of the present disclosure found that there is room for improvement in the performance of the current towers made of the composite material. The current composite crossarm is generally formed by a combination of post insulators and suspension insulators. Although the composite crossarm includes various types such as a single-post structure, a single-post single-suspension structure, and a double-post single-suspension structure, there is still room for improvement in the stability of these types of the composite crossarms.

SUMMARY

An object of this disclosure is to provide a composite crossarm and a power transmission tower, which can ensure the stability of the composite crossarm.

In order to solve the above technical problems, a technical solution adopted in this disclosure is as follows. A composite crossarm is provided. The composite crossarm includes a post insulator and three suspension insulators. The post insulator and the suspension insulators each has an end configured to be connected to a tower body of a power transmission tower, and another end connected together to form an end of the composite crossarm that is configured to attach a transmission line. The three suspension insulators are arranged at intervals around the post insulator. Axes of the two suspension insulators and an axis of the post insulator are in the same plane. The two suspension insulators whose axes are in the same plane as the axis of the post insulator are defined as first suspension insulators, the remaining suspension insulator is defined as a second suspension insulator. The two first suspension insulators form an angle ranged from 45° to 90°; the second suspension insulator and the post insulator form an angle ranged from 25° to 45°.

On the one hand, in the above composite crossarm, one post insulator and three suspension insulators are connected together to form the end for attaching the transmission line, so that a stable triangular structure is formed between the composite crossarm and the tower body, which can greatly improve the stability performance of the composite crossarm. On the other hand, the angle formed between the two first suspension insulators is in a range from 45° to 90°, which can provide favorable conditions when disposing a first grading ring and an end fitting on a high-voltage end (an end away from the tower body) of the post insulator, and disposing second grading rings on high-voltage ends (ends away from the tower body) of the two first suspension insulators. The angle formed between the second suspension insulator and the post insulator is in a range from 25° to 45°, which can provide favorable conditions when disposing the first grading ring on the high-voltage end of the post insulator, and disposing a third grading ring on the high-voltage end (an end away from the tower body) of the second suspension insulator.

In an embodiment, the composite crossarm further includes first suspension link fittings configured to connect the tower body and the first suspension insulators. The first suspension link fitting includes: a first sub-link fitting connected to the first suspension insulator; and a second sub-link fitting, having an end adjustably connected to the first sub-link fitting, and another end configured to connect the tower body, such that the first suspension insulator is connected to the tower body.

Providing the first suspension link fitting, the configuration of the composite crossarm can be changed in various ways, which is applicable for different application scenarios.

In an embodiment, the first sub-link fitting is provided with a plurality of first mounting portions arranged in an arc shape. The second sub-link fitting is selectively connected to one of the first mounting portions.

Providing the first mounting portions, a length of the first suspension link fitting is adjustable.

In an embodiment, the composite crossarm further includes a second suspension link fitting. The second suspension link fitting is configured to connect the tower body and the second suspension insulator, and has a fixed length.

The second suspension link fitting can ensure a firmly connection between the tower body and the second suspension insulator.

In an embodiment, the post insulator includes: an insulating body; a shed covering a periphery of the insulating body; a post link fitting connected to an end of the insulating body to mount the post insulator on the tower body. The post link fitting includes: an end flange tube having a hollow structure along an axial direction thereof, and sleeved on the end of the insulating body; an end flange plate covering an end of the end flange tube away from the insulating body; and a first mounting plate, an end of the first mounting plate abutting against a plate surface of the end flange plate away from the end flange tube. The first mounting plate is configured to be connected to the tower body to mount the post insulator.

Configuring the end flange plate to cover the end of the end flange tube away from the insulating body can ensure that the post insulator is not corroded by external moisture, etc., prolonging the service life of the post insulator.

In an embodiment, two first mounting plates are provided, and the two first mounting plates are perpendicular to the end flange plate.

The two first mounting plates can ensure the stability of the connection between the post insulator and the tower body.

In an embodiment, the insulating body is a solid insulating core, or the insulating body is a hollow insulating tube. Insulating gas is sealed in the hollow insulating tube. An absolute pressure value of the insulating gas is in a range from 0.1 Mpa to 0.15 Mpa.

Configuring the insulating body to be the hollow insulating tube and the insulating gas sealed therein to have an absolute pressure value ranged from 0.1 Mpa to 0.15 Mpa, daily maintenance and monitoring of the post insulator can be avoided.

In an embodiment, the shed includes a plurality of identical shed bodies arranged at intervals. The shed bodies are symmetrical with respect to a radial direction of the insulating body.

Configuring the shed bodies to be symmetrical with respect to the radial direction of the insulating body, it is beneficial to the self-cleaning of the shed, and enables the post insulator to have the characteristics of dirt resistance, rain flash resistance, ice flash resistance, and the like.

In an embodiment, the another end of the post insulator is connected to the another end of the suspension insulator through an end fitting. The end fitting includes: a first flange tube having a hollow structure along an axial direction thereof, and configured to be sleeved on an end of the post insulator; a covering plate covering an end of the first flange tub; and an attachment plate, provided at a side of the covering plate away from the first flange tube, connected to the covering plate, and configured to attach the transmission line.

The end fitting is provided with the covering plate to cover the end of the first flange tub, such that when the attachment plate used to attach the transmission line is damaged and thus needs to be replaced, the covering plate can ensure that the post insulator inside the first flange tube is not corroded by external moisture, etc., thereby ensuring the service life of the post insulator.

In an embodiment, the end fitting further includes: a connecting plate, disposed on a periphery of the first flange tube, connected to the first flange tube, and configured to be connected to the suspension insulator.

The connecting plate provided on the periphery of the first flange tube is used to connect the suspension insulator, which can avoid damaging the first flange tube when directly using the first flange tube to connect the suspension insulator (for example, providing a hole on the first flange tube), so as to ensure the strength of the first flange tube.

In an embodiment, the end fitting further includes: a second flange tube having a hollow structure along an axial direction thereof, provided coaxially with the first flange tube, and connected to another end of the first flange tube away from the covering plate. An outer peripheral surface of the second flange tube is smooth.

Providing the second flange tube, a crimping process can be used to fix the end fitting on the periphery of the post insulator, which can improve production efficiency and reduce production costs.

In an embodiment, the first flange tube is detachably connected to the second flange tube.

Configuring the first flange tube to be detachably connected to the second flange tube facilitates the transportation. In addition, when the first flange tube or the second flange tube is damaged, the first flange tube or the second flange tube can be replaced in time, thereby avoiding scrapping the entire end fitting.

In order to solve the above technical problems, another technical solution adopted in this disclosure is as follows. A power transmission tower is provided. The power transmission tower includes a tower body, and the composite crossarm as described above, connected to the tower body.

The beneficial effect achieved by the present disclosure is as follows. On the one hand, in the above composite crossarm according to the present disclosure, one post insulator and three suspension insulators are connected together to form the end for attaching the transmission line, so that the stable triangular structure is formed between the composite crossarm and the tower body, which can greatly improve the stability performance of the composite crossarm. On the other hand, the angle formed between the two first suspension insulators is set to be in a range from 45° to 90°, which can provide favorable conditions when disposing the first grading ring and the end fitting on the high-voltage end (the end away from the tower body) of the post insulator, and disposing the second grading rings on the high-voltage ends (ends away from the tower body) of the two first suspension insulators. The angle formed between the second suspension insulator and the post insulator is set to be in a range from 25° to 45°, which can provide favorable conditions when disposing the first grading ring on the high-voltage end of the post insulator, and disposing the third grading ring on the high-voltage end (the end away from the tower body) of the second suspension insulator.

In addition, in the post link fitting connecting the tower body and the post insulator, configuring the end flange plate to cover the end of the end flange tube away from the insulating body, it is can be ensured that the post insulator is not corroded by external moisture, etc., thereby prolonging the service life of the post insulator.

In addition, configuring the second sub-link fitting of the first suspension link fitting to be adjustably connected to the first sub-link fitting, the length of the first suspension link fitting is adjustable, and the configuration of the composite crossarm can be changed in various ways, which is applicable for different application scenarios.

BRIEF DESCRIPTION OF THE DRAWINGS

In order to illustrate the technical solutions in the embodiments of the present disclosure more clearly, the drawings required to be uses in the description of the embodiments will be briefly introduced below. Apparently, the drawings in the following description only illustrate some embodiments of the present disclosure. For those of ordinary skill in the art, other drawings can be obtained based on these drawings without creative work, in which.

DETAILED DESCRIPTION OF THE EMBODIMENTS

The technical solutions in the embodiments of the present disclosure will be clearly and completely described below in conjunction with the drawings in the embodiments of the present disclosure. Apparently, the described embodiments are only a part of the embodiments of the present disclosure, rather than all the embodiments. Based on the embodiments in this disclosure, all other embodiments obtained by a person of ordinary skill in the art without creative work shall fall within the protection scope of this disclosure.

Figure 1:
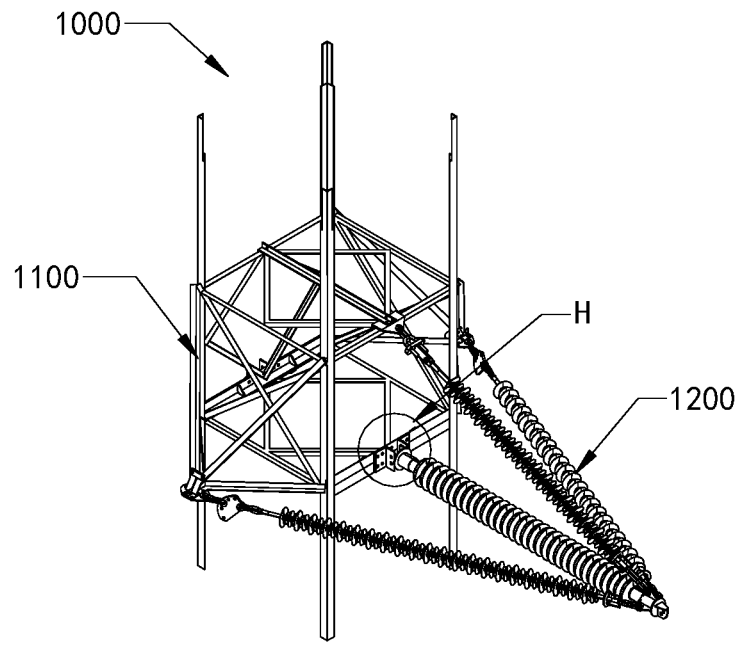
FIG. 1 is a structural schematic view of a power transmission tower according to an embodiment of the present disclosure.
Figure 2:
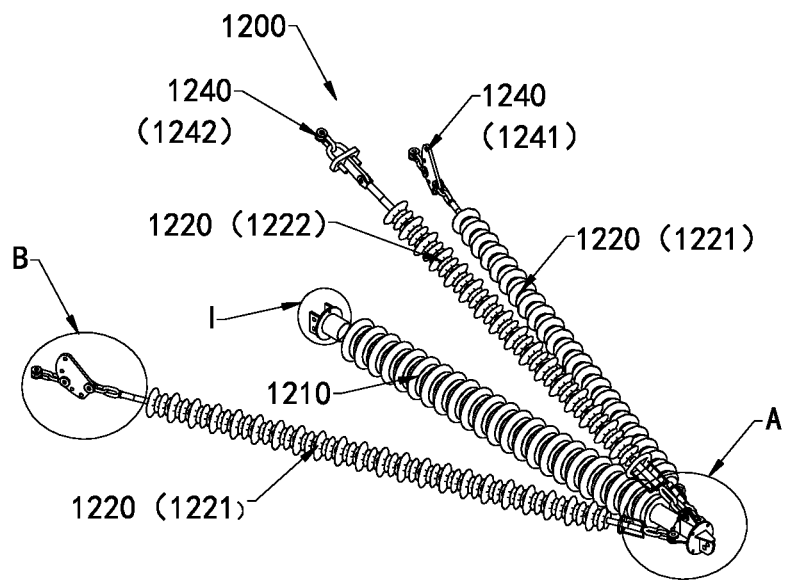
FIG. 2 is a structural schematic view of a composite crossarm in FIG. 1.
Figure 3:
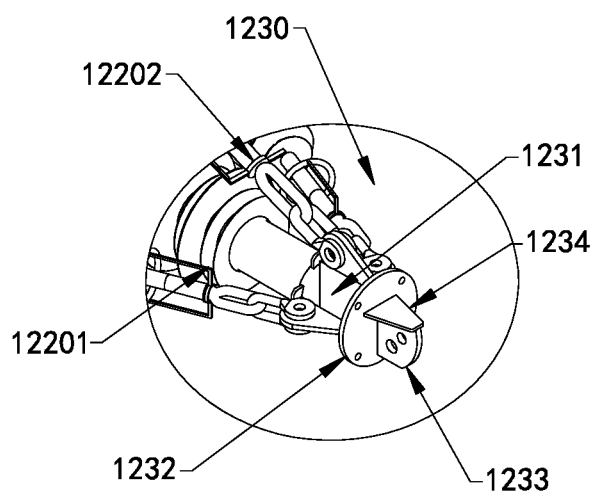
FIG. 3 is an enlarged schematic view of a portion A in FIG. 2.

Referring to FIGS. 1 to 3, a power transmission tower 1000 includes a tower body 1100 and a composite crossarm 1200 connected to the tower body 1100. The composite crossarm 1200 includes a post insulator 1210 and suspension insulators 1220.

The tower body 1100 may be a common structure such as a lattice type iron tower, a steel tube tower or a tower made of a composite material. In this embodiment, the tower body 1100 is a lattice type iron tower, and the drawings only show a part of the tower body 1100.

One end of the post insulator 1210 and one end of the suspension insulator 1220 are both connected to the tower body 1100, and another end of the post insulator 1210 and another end of the suspension insulator 1220 are connected to each other through an end fitting 1230. In this embodiment, one post insulator 1210 is provided, and at least two, such as two, three, four or even more suspension insulators 1220 are provided. At least two suspension insulators 1220 are arranged at intervals around the post insulator 1210. Axes of the two suspension insulators 1220 and an axis of the post insulator 1210 are in the same plane.

Specifically, at least two suspension insulators 1220 are connected with the post insulator 1210 through the end fitting 1230. The axes of the two suspension insulators 1220 and the axis of the post insulator 1210 are in the same plane, so that a stable triangular structure is formed between the composite crossarm 1200 and the tower body 1100, which can greatly improve the stability of the composite crossarm 1200.

Continuing to refer to FIG. 2, in this embodiment, three suspension insulators 1220 are provided. The two suspension insulators 1220 whose axes are in the same plane as the axis of the post insulator 1210 are defined as first suspension insulators 1221, the remaining suspension insulator 1220 is defined as a second suspension insulator 1222. Distances from the second suspension insulator 1222 to the two first suspension insulators 1221 are the same. The two first suspension insulators 1221 form an angle ranged from 45° to 90°, for example, an angle of 45°, 60°, or 90°. The second suspension insulator 1222 and the post insulator 1210 form an angle ranged from 25° to 45°, for example, an angle of 25°, 30°, 35°, or 45°.

Specifically, considering that the greater the angle formed between the two first suspension insulators 1221, the greater the mechanical strength that the composite crossarm 1200 can withstand, but a length of the composite crossarm 1200 and a width of the tower body 1100 also need to be increased accordingly. Therefore, the angle formed between the two first suspension insulators 1221 is controlled to be in a range from 45° to 90°, which not only meets the force requirements of the composite crossarm 1200, but also optimizes the length of the composite crossarm 1200 and the width of the tower body 1100. Similarly, controlling the range of the angle formed between the second suspension insulator 1222 and the post insulator 1210 to be in a range from 20° to 45° can also achieve the same purpose.

Specifically, three sets of composite crossarms (not shown in figures) are arranged on the tower body 1100 in sequence from bottom to top. Lengths of the three sets of composite crossarms gradually decrease or increase or the like. That is, in a vertical direction of the power transmission tower 1000, a length of the post insulator gradually decreases or increases or the like from bottom to top. The greater the length of the post insulator, the smaller the angle formed between the two first suspension insulators of the set of composite crossarms. Assuming that the angle formed between the two first suspension insulators 1221 is defined as a, the length of the post insulator 1210 is defined as L, a width of the tower body 1100 perpendicular to the post insulator 1210 in a horizontal direction is defined as D, a width of the tower body 1100 parallel to the post insulator 1210 in the horizontal direction is defined as n, and a distance from a connection point of the two first suspension insulators 1221 extending out of the tower body 1100 to the tower body 1100 is defined as m, the following can be derived from the trigonometric formula:

$$\tan\frac{\alpha}{2} = \frac{\frac{D}{2}+m}{L+\frac{n}{2}}.$$

In an application scenario, taking a power transmission tower 1000 of 220 kV as an example, L is in a range from 2000 mm to 4000 mm, D is in a range from 2000 mm to 3000 mm, m is generally set to 1000 mm, and n is generally set to 1000 mm. From the above, it can be calculated that the minimum value of α is 47.9°, and the maximum value of α is 90°. Since m and n can be adjusted, the angle formed between the two first suspension insulators 1221 can be controlled to be in a range from 45° to 90°.

Similarly, assuming that the angle formed between the second suspension insulator 1222 and the post insulator 1210 is defined as β, and the distance from a connection point between the post insulator 1210 and the tower body 1100 to a connection point between the second suspension insulator 1222 and the tower body 1100 is defined as H, the following equation can be obtained by the trigonometric formula:

$$\tan \beta = H/L.$$

Taking a power transmission tower 1000 of 220 kV as an example, H is generally set to 2000 mm. From the above, it can be calculated that the minimum value of β is 26.6°, and the maximum value of β is 45°. Since H can be further adjusted, the angle formed between the post insulator 1210 and an adjacent suspension insulator 1220 can be controlled to be in a range from 25° to 45°.

In addition, the angle formed between the two first suspension insulators 1221 is set to be in a range from 45° to 90°, which can provide favorable conditions when disposing a first grading ring (not shown in figures) and the end fitting 1230 on a high-voltage end (an end away from the tower body 1100) of the post insulator 1210, and disposing second grading rings 12201 on high-voltage ends (ends away from the tower body 1100) of the two first suspension insulators 1221. Specifically, it can ensure that there is no interference between the first grading ring on the post insulator 1210 and the second grading ring 12201 on the first suspension insulator 1221, there is no interference between the second grading rings 12201 on the two first suspension insulators 1221, and there is no interference between the first grading ring on the post insulator 1210 and the end fitting 1230, also no interference between the second grading ring 12201 on the first suspension insulator 1221 and the end fitting 1230.

In addition, the angle formed between the second suspension insulator 1222 and the post insulator 1210 is set to be in a range from 25°~45°, which can provide favorable conditions when disposing the first grading ring on the high-voltage end of the post insulator 1210 and disposing a third grading ring 12202 on a high-voltage end (an end away from the tower body 1100) of the second suspension insulator 1222. Specifically, it can ensure that the first grading ring disposed on the post insulator 1210 and the third grading ring 12202 disposed on the second suspension insulator 1222 when mounted in a dislocation.

Continuing to refer to FIGS. 1 and 2, in this embodiment, the post insulator 1210 and the two first suspension insulators 1221 are mounted in a same height, and the second suspension insulator 1222 is located above the post insulator 1210. It should be noted that in other embodiments, when more than one second suspension insulator 1222 is provided, the second suspension insulators 1222 can be provided above and below the post insulator 1210, so that the tensile forces of the transmission line in various directions can be balanced. When the second suspension insulator 1222 is located above the post insulator 1210, the second suspension insulator 1222 can act as a tensile support to prevent the end of the post insulator 1210 away from the power transmission tower 1000 from bending downwards after the transmission line is attached thereto to affect the long-term service life of the post insulator 1210.

The post insulator 1210 may be provided horizontally (in FIG. 1, which is shown to be provided horizontally), or may be provided obliquely.

In addition, in order to ensure the composite crossarm 1200 is uniformly stressed, an angle formed between one of the two first suspension insulators 1221 and the post insulator 1210 is equal to an angle formed between the other of the two first suspension insulators 1221 and the post insulator 1210. In this condition, the axes of the two first suspension insulators 1221 and the axis of the post insulator 1210 are in the same horizontal plane.

Of course, in other embodiments, the angle formed between one of the two first suspension insulators 1221 and the post insulators 1210 may also be unequal to the angle formed between the other of the two first suspension insulators 1221 and the post insulator 1210, which is not limited herein.

The other two composite crossarms have structures similar to the composite crossarm 1200, and which will not be repeated herein.

Figure 4:
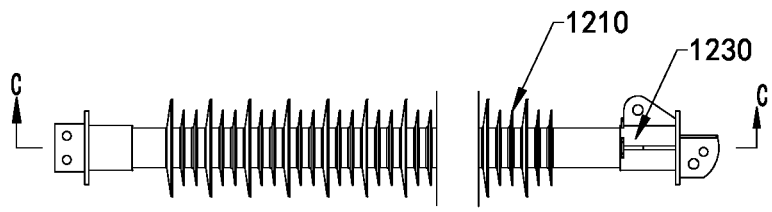
FIG. 4 is a structural schematic view of a post insulator connected to an end fitting in FIG. 2.
Figure 5:
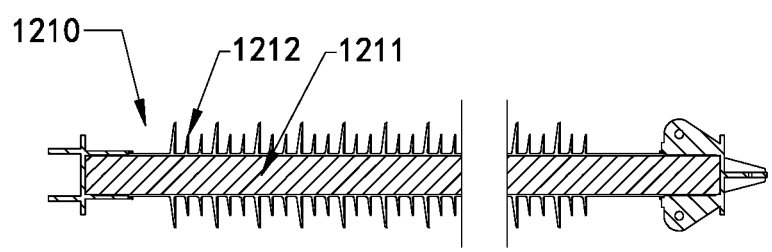
FIG. 5 is a cross-sectional schematic view taken in a line C-C of FIG. 4.

Referring to FIGS. 4 and 5, in this embodiment, the post insulator 1210 includes an insulating body 1211 and a shed 1212 covering a periphery of the insulating body 1211.

Specifically, the insulating body 1211 may be a solid insulating core or a hollow insulating tube. When the insulating body 1211 is a solid insulating core, it may be a solid core rod formed by winding or pultrusion, or winding and pultrusion of glass fiber or aramid fiber impregnated with epoxy resin. When the insulating body 1211 is a hollow insulating tube, it may be a hollow pultruded tube formed by pultrusion and winding of glass fiber or aramid fiber impregnated with epoxy resin; or may be a fiber glass reinforced plastic tube formed by winding and curing or pultrusion of glass fiber impregnated with epoxy resin; or may be an aramid fiber tube formed by winding and curing aramid fiber impregnated with epoxy resin, which is not limited herein.

The insulating body 1211 may be cylindrical (illustrated by a cylindrical shape in the drawings), conical or other shapes (such as a drum shape), which is not limited herein. When the insulating body 1211 is conical, a tapered end (an end with a smaller diameter) of the insulating body 1211 is connected to the end fitting 1230, and another end thereof is connected to the tower body 1100, so that the post insulator 1210 can withstand much more pressure from the transmission line.

In an application scenario, when the insulating body 1211 is a hollow insulating tube, insulating gas is sealed in the insulating body 1211. An absolute pressure value of the insulating gas is in a range from 0.1 Mpa to 0.15 Mpa, for example, 0.1 Mpa, 0.12 Mpa, or 0.15 Mpa.

Specifically, the gas sealed in the hollow insulating tube may be dried high-purity nitrogen, air, or sulfur hexafluoride, which is not limited herein.

In addition, setting the absolute pressure value of the insulating gas to be in a range from 0.1 Mpa to 0.15 Mpa can make the insulating gas uneasy to leak from the hollow insulating tube, which can avoid the daily maintenance and monitoring of the post insulator 1210, and further meet different pressure requirements between different regions and altitudes, to ensure that the internal gas of the hollow insulating tube is in a non-negative pressure state when used in different regions, and further, the hollow insulating tube can have a larger margin of moisture control, effectively reducing the difficulty of moisture control.

In other application scenarios, when the insulating body 1211 is a hollow insulating tube, inert gas or solid materials such as polyurethane and liquid silicone rubber can be sealed in the insulating body 1211, which is not limited herein.

In addition, the shed 1212 can be made of high-temperature vulcanized silicone, liquid silicone rubber, room temperature vulcanized silicone rubber or the like, which is not limited herein.

In an application scenario, the shed 1212 includes a plurality of identical shed bodies arranged at intervals. That is, all shed bodies are the same, and the shed bodies are symmetrical with respect to a radial direction of the insulating body 1211, that is, two opposite surfaces of the shed body have opposite inclination directions with same inclination angles. Specifically, the shed bodies are symmetrical with respect to the radial direction of the insulating body 1211, such that, on the one hand, compared with the prior art in which the two opposite surfaces of the shed body are inclined in the same direction, in the present disclosure, rainwater can flow down along the shed 1212 (due to that the post insulator 1210 is provided horizontally, if the two opposite surfaces of the shed body are inclined in the same direction, the rainwater is likely to accumulate in an angle formed between the insulating body 1211 and the shed body), so that no water film is formed on the surface of the shed 1212, and it is beneficial to the self-cleaning of the shed 1212; and on the other hand, the two opposite sides of the shed body can have the same mechanical properties, so that the post insulator 1210 has the characteristics of dirt resistance, rain flash resistance, ice flash resistance, more economy and the like.

In an application scenario, in order to avoid bridging caused by turbulence and dirt accumulation between two adjacent shed bodies, a distance between two adjacent shed bodies is greater than 40 mm and not more than 60 mm, for example, 45 mm, 50 mm or 60 mm. Of course, the distance between two adjacent shed bodies should be reduced as much as possible, so as to increase the distribution density of shed bodies and make it difficult for birds to stand on the sheath, thereby preventing bird damage accidents. In addition, under the requirement of ensuring the minimum creepage distance, a height of the shed body protruding from a side of the insulating body 1211 is not more than 80 mm, generally set to 50 mm~80 mm, such as 50 mm, 60 mm or 70 mm.

It should be noted that, in other embodiments, the shed 1212 may also have other structures. For example, two adjacent shed bodies have different sizes, or the two opposite surfaces of the shed body are inclined in the same direction. In short, the specific structure of the shed 1212 is not limited in the present disclosure.

Figure 6:
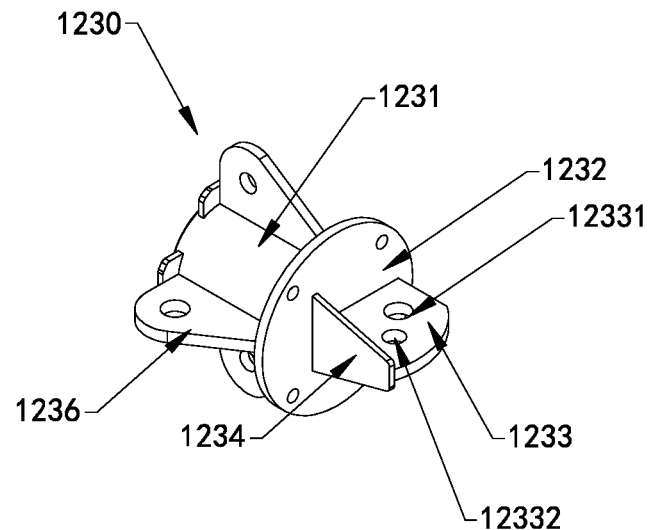
FIG. 6 is a structural schematic view of an end fitting in FIG. 3.
Figure 7:
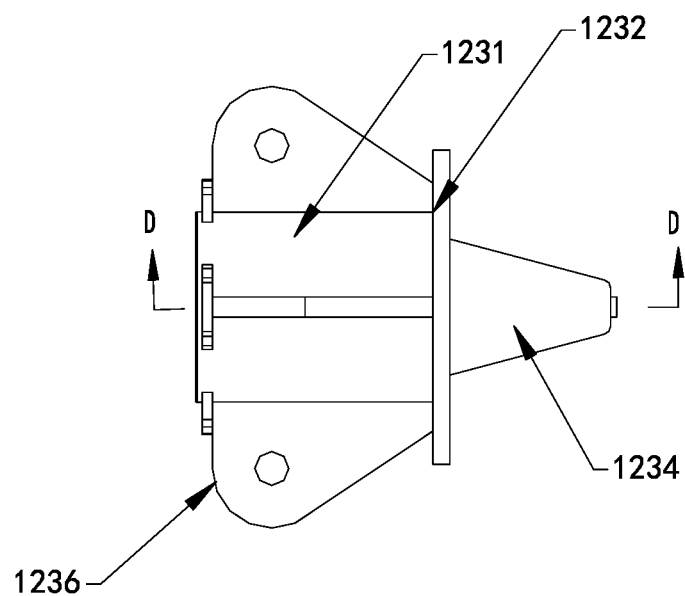
FIG. 7 is a structural schematic view of the end fitting in FIG. 3, when being viewed in another perspective.

Referring to FIGS. 3, 6 and 7, in this embodiment, the end fitting 1230 includes a first flange tube 1231, a covering plate 1232, and an attachment plate 1233.

The first flange tube 1231 has a hollow structure along an axial direction thereof, and is used to be sleeved the end of the post insulator 1210, specifically, sleeved on the end of the insulating body 1211 in the post insulator 1210. The covering plate 1232 covers an end of the first flange tube 1231. The attachment plate 1233 is provided at a side of the covering plate 1232 away from the first flange tube 1231 and is connected to the covering plate 1232, and is configured to attach the transmission line.

Specifically, when the attachment plate 1233 used to attach the transmission line is damaged and thus needs to be replaced, since the covering plate 1232 covers one end of the first flange tube 1231, it can be ensured that the post insulator 1210 inside the first flange tube 1231 is not corroded by external moisture, etc., thereby ensuring the service life of the post insulator 1210.

Continuing to refer to FIGS. 6 and 7, one end of the attachment plate 1233 abuts against a surface of a side of the covering plate 1232 away from the first flange tube 1231, and a reinforcing member 1234 is further connected between a side surface of the attachment plate 1233 and the covering plate 1232.

Specifically, the reinforcing member 1234 can enhance a connection between the attachment plate 1233 and the covering plate 1232, and avoid the connection between the attachment plate 1233 and the covering plate 1232 from being broken due to insufficient connection strength.

In an application scenario, as shown in FIG. 6, the reinforcing member 1234 is a plate member, and the covering plate 1232, the attachment plate 1233, and the reinforcing member 1234 are perpendicular to each other.

In order to prevent the end fittings 1230 from being corroded by moisture, etc., a surface of the end fittings 1230 is hot dip galvanized. In addition, the end fittings 1230 can be made of cast aluminum, cast iron or alloy steel, etc., which is not limited herein.

In addition, various parts of the end fittings 1230 can be connected together by welding or the like.

Continuing to refer to FIG. 6, the attachment plate 1233 is provided with a first wire attaching portion 12331 which can be used to attach the power transmission line. Specifically, a wire clamp for connecting the transmission line is provided on the first wire attaching portion 12331, so as to attach the transmission line. One, two, four or even more first wire attaching portions 12331 may be provided, which is not limited herein. When a plurality of first wire attaching portions 12331 are provided, a plurality of wire clamps connected to the same transmission line can be mounted on the plurality of first wire attaching portions 12331 respectively, such that when one of the wire clamps is damaged, it can still be ensured that the transmission line is safely attached.

In an application scenario, as shown in FIG. 6, the first wire attaching portion 12331 is a wire attaching through-hole. The side surface of the attachment plate 1233 without the first wire attaching portion 12331 is connected to the reinforcing member 1234. Specifically, this configuration can ensure that the reinforcing member 1234 cannot affect the mounting of the wire clamp on the attachment plate 1233.

In addition, in this application scenario, one first wire attaching portion 12331 is provided, and the attachment plate 1233 is further provided with a construction hole 12332 for lifting operation. Of course, in other application scenarios, more than one first wire attaching portion 12331 may be provided.

Figure 8:
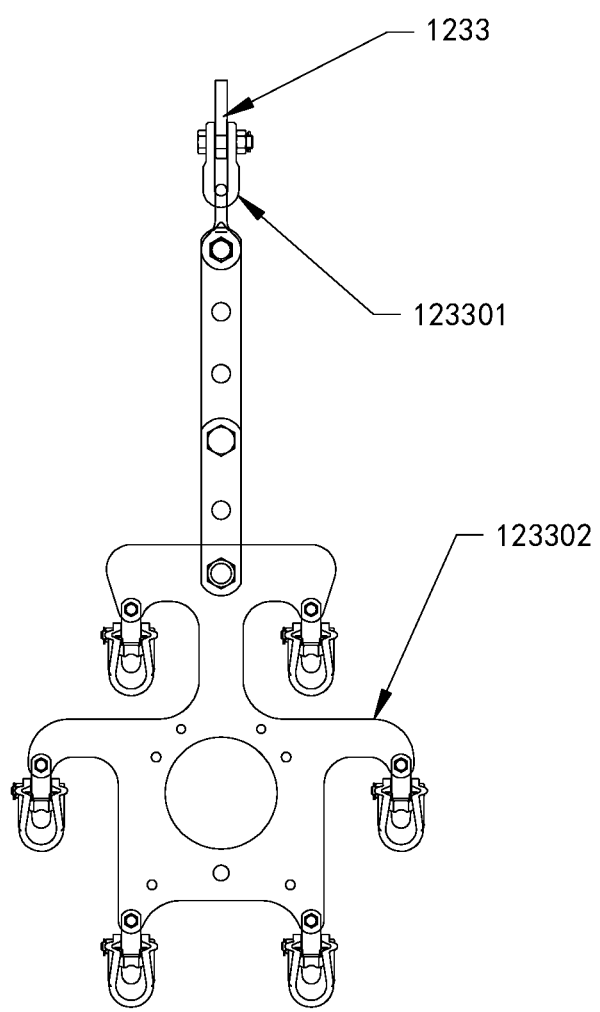
FIG. 8 is a structural schematic view of an attachment plate connected to a wire clamp in an application scenario.

In an application scenario, as shown in FIG. 8, when the attachment plate 1233 is used to attach a single transmission line, the attachment plate 1233 is connected with a U-shaped hanging ring 123301. Specifically, two ends of the U-shaped hanging ring 123301 are connected to the attachment plate 1233, and the U-shaped hanging ring 123301 is connected to the wire clamp 123302 used for dangling the transmission line.

When the attachment plate 1233 is used to attach two transmission lines, the attachment plate 1233 is also connected with the U-shaped hanging ring 123301, but unlike attaching a single transmission line, the U-shaped hanging ring 123301 is further connected to a middle yoke plate. In this case, the middle yoke plate connects two wire clamps 123302 used for dangling the transmission lines respectively. In an application scenario, a cross section of the middle yoke plate is substantially in a shape of an isosceles triangle, two wire clamps 123302 are connected to two bottom corners of the middle yoke plate respectively, and the U-shaped hanging ring 123301 is connected to a top corner of the middle yoke plate.

Figure 9:
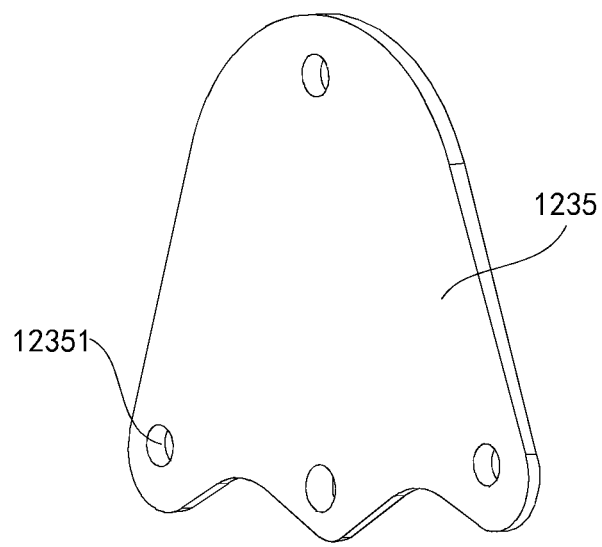
FIG. 9 is a structural schematic view of a yoke plate.

In an application scenario, referring to FIG. 9, the composite crossarm 1200 further includes a yoke plate 1235, which is used to connect to the attachment plate 1233. The yoke plate 1235 is provided with a second wire attaching portion 12351 that can be used to attach the transmission line. The number of the second wire attaching portions 12351 is greater than the number of the first wire attaching portions 12331. Specifically, due to the area limitation of the attachment plate 1233, the number of the first wire attaching portions 12331 allowed to be provided is limited, which cannot meet the wire attaching requirements in some application scenarios, and the configuration of the yoke plate 1235 can expand the number of the first wire attaching portions 12331.

In an application scenario, in order to be able to adapt to the requirements of different application scenarios, the yoke plate 1235 is connected to the attachment plate 1233 through a length-adjustable link fitting (not shown in figures), so that a relative distance between the yoke plate 1235 and the attachment plate 1233 can be adjusted according to the requirements in different application scenarios.

In an application scenario, the second wire attaching portion 12351 has same structure as the first wire attaching portion 12331, for example, both of them are wire attaching through-holes. Of course, the second wire attaching portion 12351 may have a different structure than the first wire attaching portion 12331. For example, the first wire attaching portion 12331 is a wire attaching through-hole, and the second wire attaching portion 12351 is a wire attaching slot. In short, the specific structures of the first wire attaching portion 12331 and the second wire attaching portion 12351 are not limited in the present disclosure.

Referring to FIGS. 3, 6 and 7, in this embodiment, the end fitting 1230 further includes a connecting plate 1236. The connecting plate 1236 is disposed on the periphery of the first flange tube 1231, is connected to the first flange tube 1231, and is configured to be connected to the suspension insulator 1220.

Specifically, the connecting plate 1236 may be disposed on the periphery of the first flange tube 1231 by means such as welding or the like.

Providing the connecting plate 1236 on the periphery of the first flange tube 1231 to connect the suspension insulator 1220, can avoid damage to the first flange tube 1231 (for example, providing a hole on the first flange tube 1231) when the suspension insulator 1220 is used to connect the first flange tube 1231 directly, so as to ensure the strength of the first flange tube 1231.

In this embodiment, one, or at least two connecting plates 1236 may be provided. When one connecting plate 1236 is provided, in order to connect all the suspension insulators 1220, the connecting plate 1236 can extend around the first flange tube 1231 to form a semi-enclosing structure or a full-enclosing structure. When at least two connecting plates 1236 are provided, different connecting plates 1236 can be connected to different suspension insulators 1220. That is, the number of connecting plates 1236 can be equal to the number of suspension insulators 1220. In addition, at least two connecting plates 1236 are arranged at intervals in a circumferential direction of the first flange tube 1231 (as shown in FIGS. 3 and 6).

Figure 10:
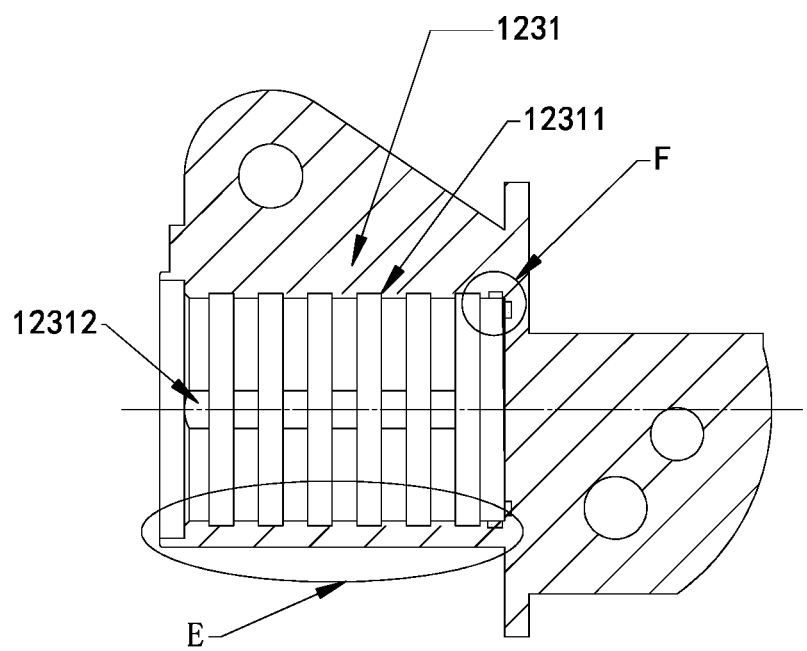
FIG. 10 is a cross-sectional schematic view of the end fitting taken in a line D-D of FIG. 7.

Referring to FIGS. 7 and 10, in this embodiment, an inner wall of the first flange tube 1231 is provided with a plurality of binding grooves 12311 arranged at intervals along the axial direction and a plurality of flowing grooves 12312 that are in communication with the plurality of binding grooves 12311. The binding grooves 12311 and the flowing grooves 12312 are filled with adhesives to connect the first flange tube 1231 to the insulating body 1211 fixedly.

Specifically, in the production process, the end fittings 1230 and the insulating body 1211 are connected to each other by using a horizontal binding process or a vertical binding process. During the production process, an adhesive is firstly injected between the first flange tube 1231 and the insulating body 1211 through an adhesive injecting hole, and then is cured at a high temperature for a certain period of time, so that the end fittings 1230 and the insulating body 1211 can be fixedly connected to each other.

The flowing grooves 12312 are arranged along an axial direction of the flange tube 1231. The configuration of the flowing grooves 12312 can let the adhesive injected between the first flange tube 1231 and the insulating body 1211 flow between the adjacent binding grooves 12311, such that the adhesive injecting rate can be increased, the risk of bubble detention can be reduced. As such, the end fittings 1230 and the insulating body 1211 are more firmly bonded to each other, so as to improve the torsion resistance performance of the composite crossarm 1200 without replacing the adhesive with another adhesive with better bonding performance.

One or more (for example, two, four, six or even more) flowing grooves 12312 can be provided. When a plurality of flowing grooves 12312 are provided, the plurality of flowing grooves 12312 are arranged at intervals along the circumferential direction of the first flange tube 1231. One flowing groove 12312 may only be in communication with two adjacent binding grooves 12311, or may be in communication with three adjacent, four adjacent or even all the binding grooves 12311, which is not limited herein.

A bottom surface of the flowing groove 12312 is a flat surface or a curved surface. Specifically, when a radial depth and a width of the flowing groove 12312 with respect to the end fittings 1230 are constant, the flowing groove 12312 with a flat bottom surface is more complex and expensive to be processed than the flowing groove 12312 with a curved bottom surface, but has higher torsional strength, because of the larger contact area between the adhesive in the flat groove and the inner wall of the first flange tube 1231. That is, compared with the flowing groove 12312 with the flat bottom surface, the flowing groove 12312 with the curved bottom surface is convenient to be processed and has low processing cost, but has a slightly lower torsional strength.

Figure 11:
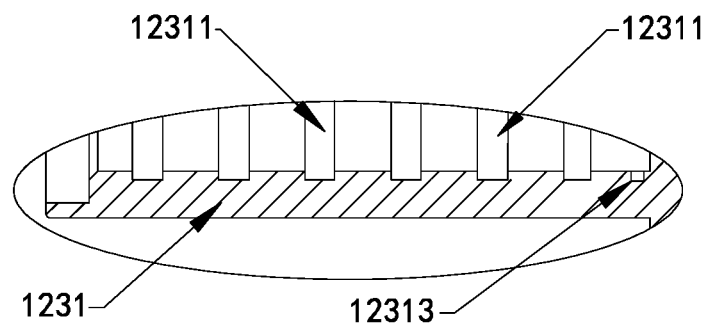
FIG. 11 is an enlarged schematic view of a portion E in FIG. 10.

Referring to FIGS. 10 and 11, in the axial direction of the flange tube 1231, the plurality of binding grooves 12311 have the same widths, and a width of the binding grooves 12311 is smaller than a width of an interval between two adjacent binding grooves 12311. Specifically, the width of the binding groove 12311 is provided to be smaller than the width of the interval between the two adjacent binding grooves 12311, so that an binding matching groove on the insulating body 1211 (not shown in the figures, which has the same specification as and is provided opposite to the binding groove 12311 on the first flange tube 1231) also has a width smaller than a width of the interval between two adjacent binding matching grooves. This configuration can ensure the shear resistance of the post insulator 1210, compared with the width of the binding matching groove on the insulating body 1211 being greater than or equal to the width of the interval between two adjacent binding matching grooves.

The width of the binding groove 12311 does not exceed 12 mm Specifically, the axial shear strength of the insulating body 1211 itself is relatively low. When the insulating body 1211 is damaged, a part that is sleeved into the first flange tube 1231 and is not bonded by the adhesive, that is, a part on the insulating body 1211, which is located between two adjacent binding matching grooves, is firstly damaged. When a width of the first flange tube 1231 along its axial direction is constant, if the width of the binding groove 12311 decreases, the distance between two adjacent binding grooves 12311 will increase. That is, the distance between the two adjacent binding matching grooves on the insulating body 1211 will increase, and thus the strength of the insulating body 1211 against shear failure will increase, which will eventually increase the shear resistance of the post insulator 1210 of the same specification. However, if the width of the binding groove 12311 is too small, the processing time and processing cost will increase. Therefore, the width of the binding groove 12311 should not exceed 12 mm, for example, 12 mm, 10 mm or 8 mm, etc., which can not only ensure the strength of the composite crossarm 1200, but also ensure the processing time and processing cost are all within a reasonable range.

In order to facilitate processing, the bottom surface of the binding groove 12311 is a curved surface.

A ratio of a length of a contact portion between the inner wall of the first flange tube 1231 and the insulating body 1211 to an outer diameter of the insulating body 1211 (i.e., a binding ratio) is in a range from 0.8 to 1.2, for example, which is 0.8, 1.0 or 1.2. Specifically, as the binding ratio decreases, the strength of the composite crossarm 1200 will decrease significantly. For example, compared to the binding ratio of 0.8, when the binding ratio drops to 0.75, the strength of the composite crossarm 1200 will decrease by 20%. Compared to the binding ratio of 1.2, when the binding ratio increases to 1.4, although the strength of the composite crossarm 1200 will increase slightly, the cost will increase significantly. Therefore, the binding ratio is in a range from 0.8 to 1.2, such that the composite crossarm 1200 has the advantages of low cost and high strength.

In addition, it should be noted that, in other embodiments, the binding groove 12311 and the flowing groove 12312 may also have other sizes, which are not limited herein.

In an application scenario, referring to FIGS. 5, 7, 10 and 12, a plate surface of the covering plate 1232 facing the insulating body 1211 is provided with a first sealing groove 12321 facing an end surface of the insulating body 1211. The first sealing groove 12321 is provided with a first sealing member (not shown in figures) therein. Specifically, the first sealing member is disposed in the first sealing groove 12321 to prevent external moisture or the adhesive from entering the insulating body 1211, to avoid leakage of gas in the insulating body 1211, and to prevent external moisture or the adhesive from entering the covering plate 1232 to affect the sealing between the insulating body 1211 and the end fittings 1230.

Figure 12:
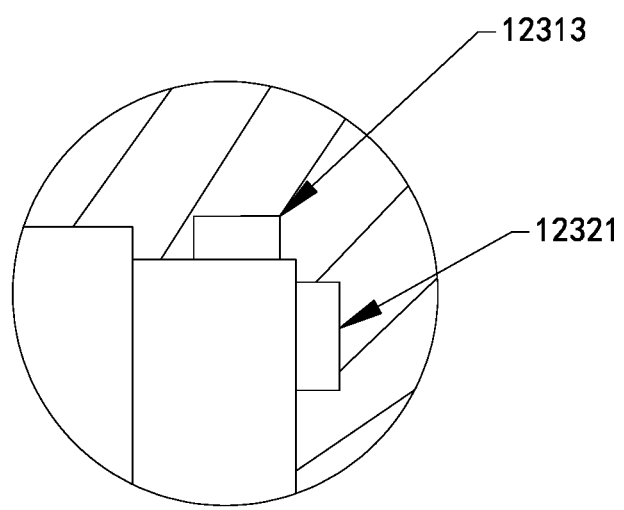
FIG. 12 is an enlarged schematic view of a portion F of FIG. 10 in an application scenario.

Continuing to refer to FIGS. 10 and 12, the inner wall of the first flange tube 1231 is further provided with a second sealing groove 12313 adjacent to the covering plate 1232. The second sealing groove 12313 and the plurality of binding grooves 12311 are arranged alternately at intervals in a direction away from the covering plate 1232. The second sealing groove 12313 is provided with a second sealing member (not shown in the figure) therein. Specifically, the second sealing member has different function than that of the first sealing member. The second sealing member is used to prevent the adhesive from entering the first sealing groove 12321 to corrode the first sealing member and cause the first sealing member to fail during the adhesive boning process.

Figure 13:
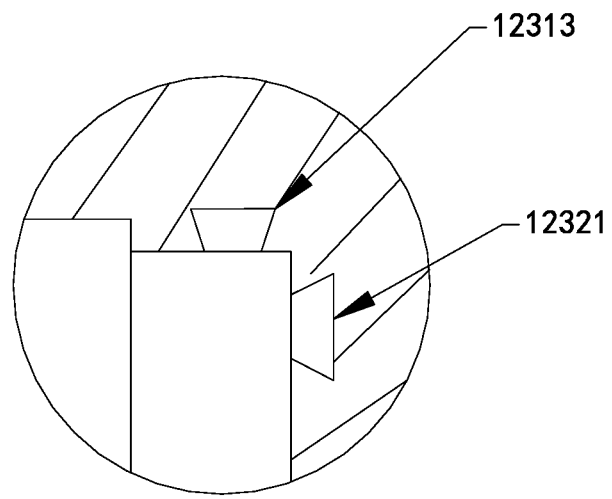
FIG. 13 is an enlarged schematic view of the portion F of FIG. 10 in another application scenario.

A width of the first sealing groove 12321 and/or a width of the second sealing groove 12313 remain unchanged in a direction close to the insulating body 1211 (as shown in FIG. 12) or decrease gradually (as shown in FIG. 13). Specifically, the first sealing groove 12321 whose width remains unchanged in the direction close to the insulating body 1211 is easy to be processed, but the first sealing member therein is prone to slip or even fall off. In this case, in order to avoid the relative slip of the first sealing member in the first sealing groove 12321, the first sealing member is fixedly bonded in the first sealing groove 12321 by resin or silicone. Compared with the first sealing groove 12321 whose width remains unchanged in the direction close to the insulating body 1211, the first sealing groove 12321 whose width decreases gradually in the direction close to the insulating body 1211 has a more complicated processing process, but it can be ensured that the first sealing member will not easily fall off. The width of the first sealing groove 12321 and/or the width of the second sealing groove 12313 can decrease linearly in the direction close to the insulating body 1211 (as shown in FIG. 13), or can decrease curvilinearly, which is not limited herein.

Figure 14:
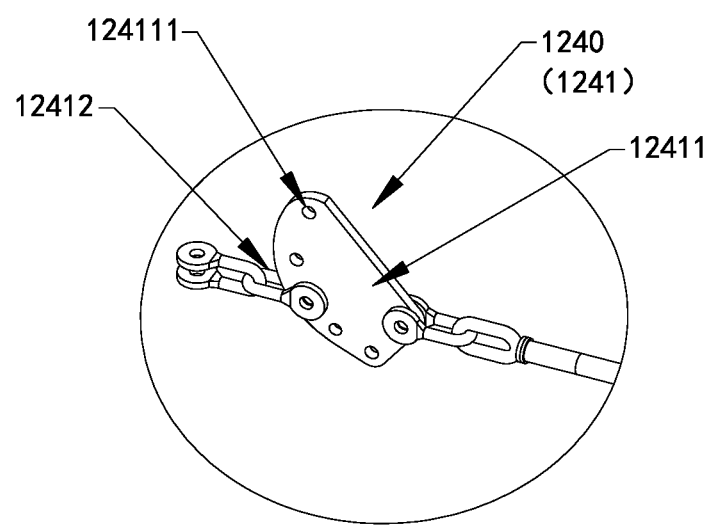
FIG. 14 is an enlarged schematic view of a portion B in FIG. 2.

Referring to FIGS. 2 and 14, in this embodiment, the composite crossarm 1200 further includes a suspension link fitting 1240 used for connecting the tower body 1100 and the suspension insulator 1220.

In this embodiment, a length of the suspension link fitting 1240 connecting the tower body 1100 and the first suspension insulator 1221 is adjustable, and a length of the suspension link fitting 1240 connecting the tower body 1100 and the second suspension insulator 1222 is fixed. For ease of description, the suspension link fitting 1240 connecting the tower body 1100 and the first suspension insulators 1221 is defined as a first suspension link fitting 1241, and the suspension link fitting 1240 connecting the tower body 1100 and the second suspension insulator 1222 is defined as a second suspension link fitting 1242.

The first suspension link fitting 1241 includes a first sub-link fitting 12411 and a second sub-link fitting 12412.

The first sub-link fitting 12411 is connected to the first suspension insulator 1221. An end of the second sub-link fitting 12412 is adjustably connected to the first sub-link fitting 12411, and another end thereof is used to connect the tower body 1100, such that the first suspension insulator 1221 is connected to the tower body 1100. Specifically, one end of the second sub-link fitting 12412 is adjustably connected to the first sub-link fitting 12411, so that the configuration of the composite crossarm 1200 can be changed in various ways, which is applicable for different application scenarios.

In an application scenario, as shown in FIG. 14, the first sub-link fitting 12411 is provided with a plurality of first mounting portions 124111 arranged in an arc shape. The second sub-link fitting 12412 is selectively connected to one of the first mounting portions 124111. Specifically, the plurality of first mounting portions 124111 are arranged in an arc shape, so that the distance and the relative angle between the tower body 1100 and the first suspension insulator 1221 can be adjusted.

In an application scenario, as shown in FIG. 14, the first sub-link fitting 12411 is a fan-shaped flat fitting, and the second sub-link fitting 12412 is a slot fitting.

In other embodiments, the plurality of first mounting portions 124111 may also be arranged in a straight line along an extending direction of the first suspension insulator 1221, which is not limited herein.

In other embodiments, it is also possible that the second sub-link fitting 12412 is connected to the first suspension insulator 1221, and the first sub-link fitting 12411 is connected to the tower body 1100, which is not limited herein.

In addition, in other embodiments, both of, or neither of the suspension link fitting 1240 that connects the tower body 1100 and the first suspension insulator 1221, and the suspension link fitting 1240 that connects the tower body 1100 and the second suspension insulator 1222 can be adjusted in length. In other words, the first suspension link fitting 1241 or the second suspension link fitting 1242 can connect the tower body 1100 and the first suspension insulator 1221. Similarly, the first suspension link fitting 1241 or the second suspension link fitting 1242 can connect the tower body 1100 and the second suspension insulator 1222, which is not limited herein.

Referring to FIGS. 1, 2, 15 and 16, in this embodiment, the post insulator 1210 further includes a post link fitting 1250 used for connecting the tower body 1100 and the post insulator 1210. The post link fitting 1250 includes an end flange tube 1251, an end flange plate 1252 and a first mounting plate 1253.

The end flange tube 1251 has a hollow structure along an axial direction thereof, and is sleeved on the end of the post insulator 1210 connected to the tower body 1100, specifically sleeved on one end of the insulating body 1211. The end flange plate 1252 covers an end of the end flange tube 1251 away from the insulating body 1211 to prevent the end of the insulating body 1211 from being corroded by external moisture or the like, and to protect the insulating body 1211. An end of the first mounting plate 1253 abuts against a plate surface of the end flange plate 1252 away from the end flange tube 1251. In addition, the first mounting plate 1253 is provided with a second mounting portion 12531 used for mounting the first mounting plate 1253 on the tower body 1100, to connect the post insulator 1210 and the tower body 1100. In an application scenario, the second mounting portion 12531 is a through hole. In this case, a fastener such as a bolt may be used to pass through the through hole to mount the first mounting plate 1253 on the tower body 1100.

Figure 16:
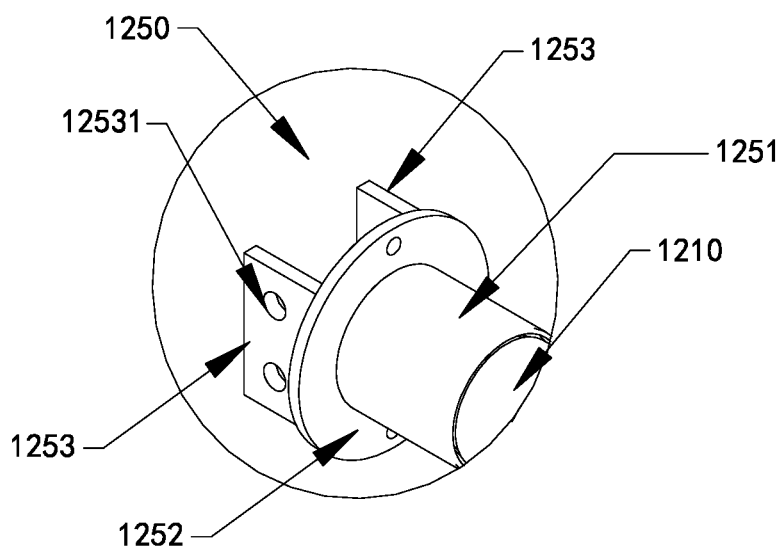
FIG. 16 is an enlarged schematic view of a portion I in FIG. 2.

In an application scenario, as shown in FIG. 16, the first mounting plate 1253 is a straight plate. In order to ensure the firmly connection between the tower body 1100 and the post insulator 1210, two first mounting plates 1253 are provided. The two first mounting plates 1253 are arranged in parallel with each other. Of course, in other application scenarios, one, three, or more first mounting plates 1253 may also be provided. In addition, as shown in FIG. 16, the two first mounting plates 1253 are both vertically disposed on the end flange plate 1252. Of course, in other application scenarios, the first mounting plate 1253 may not be vertically disposed on the end flange plate 1252, which is not limited herein.

Figure 15:
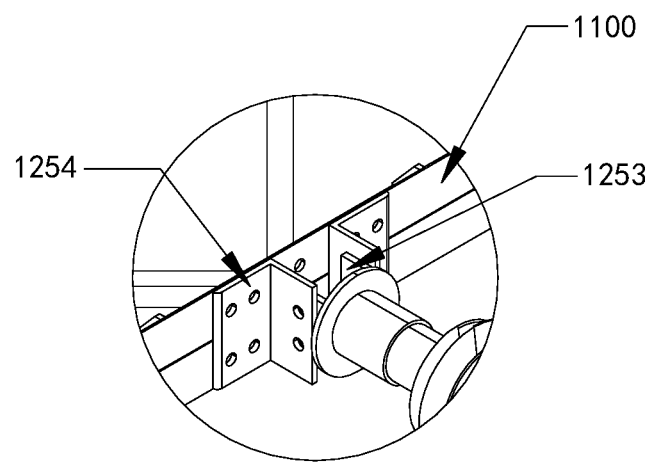
FIG. 15 is an enlarged schematic view of a portion H in FIG. 1.

Continuing to combine FIGS. 1 and 15, in order to adapt the post link fitting 1250 to different application scenarios, the post link fitting 1250 further includes a second mounting plate 1254. The second mounting plate 1254 is detachably connected to the first mounting plate 1253 used for connecting the first mounting plate 1253 and the tower body 1100, so that the first mounting plate 1253 can be directly connected to the tower body 1100 according to different requirements, or the first mounting plate 1253 can be connected to the tower body 1100 through the second mounting plate 1254.

In an application scenario, as shown in FIG. 15, in order to increase the contact area between the second mounting plate 1254 and the tower body 1100 and ensure the connection strength between the second mounting plate 1254 and the tower body 1100, the second mounting plate 1254 is a bent plate. An end of the bent plate 1254 is attached to a beam of the tower body 1100, and another end thereof is attached to the first mounting plate 1253.

In an application scenario, with reference to FIGS. 15 and 16, the number of first mounting plates 1253 is equal to the number of second mounting plates 1254, and when one second mounting plate 1254 is mounted, and correspondingly, one first mounting plate 1253 is mounted.

Figure 17:
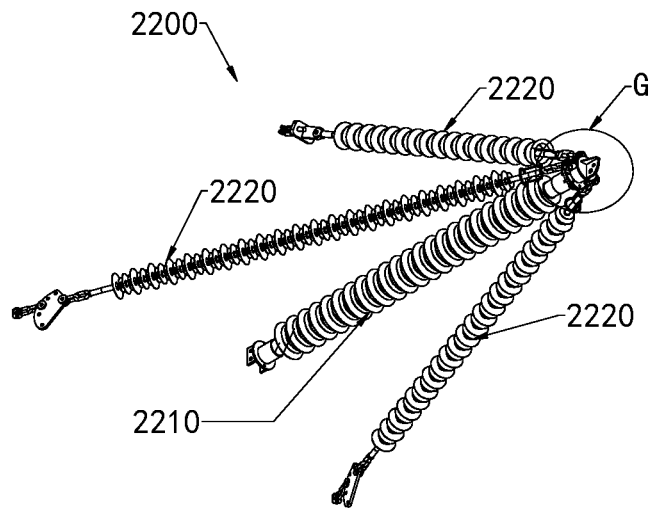
FIG. 17 is a structural schematic view of a composite crossarm according to another embodiment.
Figure 18:
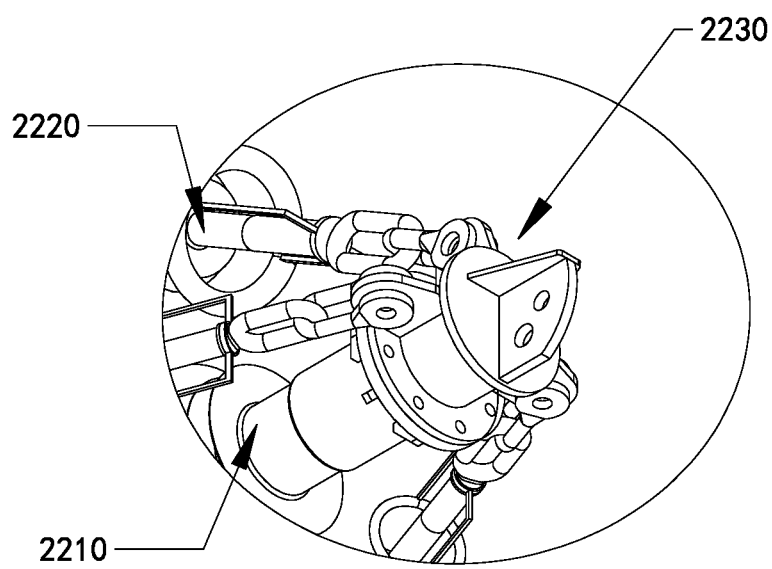
FIG. 18 is an enlarged schematic view of a portion G in FIG. 17.
Figure 19:
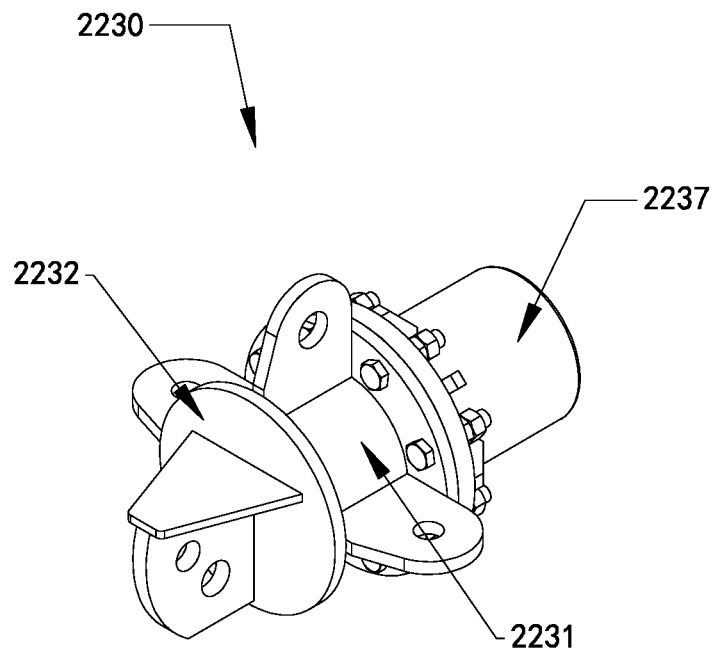
FIG. 19 is a structural schematic view of an end fitting in FIG. 18.

Referring to FIGS. 17 to 19, unlike the foregoing embodiments, in the composite crossarm 2200 of this embodiment, the end fitting 2230 further includes a second flange tube 2237. The second flange tube 2237 has a hollow structure along an axial direction thereof. The second flange tube 2237 is provided coaxially with the first flange tube 2231 and connected to another end of the first flange tube 2231 away from the covering plate 2232. An outer peripheral surface of the second flange tube 2237 is smooth.

Specifically, since the outer peripheral surface of the second flange tube 2237 is smooth, this second flange tube 2237 with the smooth outer peripheral surface can be fixed around the post insulator 2210 by a crimping process. In addition, since the first flange tube 2231 is connected to the second flange tube 2237, when the second flange tube 2237 is fixed around the post insulator 2210 by the crimping process, the first flange tube 2231 can also be fixed around the post insulator 2210. That is, the end fitting 2230 is fixed around the post insulator 2210 by the crimping process.

In the foregoing embodiments, the end fitting 1230 is mounted on the post insulator 1210 by the binding process. Compared with the crimping process, the binding process has a long process time, low molding efficiency, and requires a large number of molding tooling, and the molded post insulator 1210 bears the bending load and the torsion load poorly. That is, in this embodiment, the crimping process is used to mount the end fitting 2230 on the post insulator 2210, which can improve production efficiency and reduce production costs (reducing the number of molding toolings that are used), and ensure that the post insulator 2210 can bear the bending load and torsion load well.

In this embodiment, the first flange tube 2231 is detachably connected to the second flange tube 2237. This configuration can detach the end fittings 2230 during transportation, facilitating the transportation. In addition, when the first flange tube 2231 or the second flange tube 2237 is damaged, the first flange tube 2231 or the second flange tube 223 can be replaced in time, thereby avoiding scrapping the entire end fitting 2230.

In addition, during transportation, only the second flange tube 2237 can be fixed on the post insulator 2210. Then, after reaching the destination, the first flange tube 2311 can be connected to the second flange tube 2237, thereby reducing the packaging cost of the post insulator 2210 during transportation.

Figure 20:
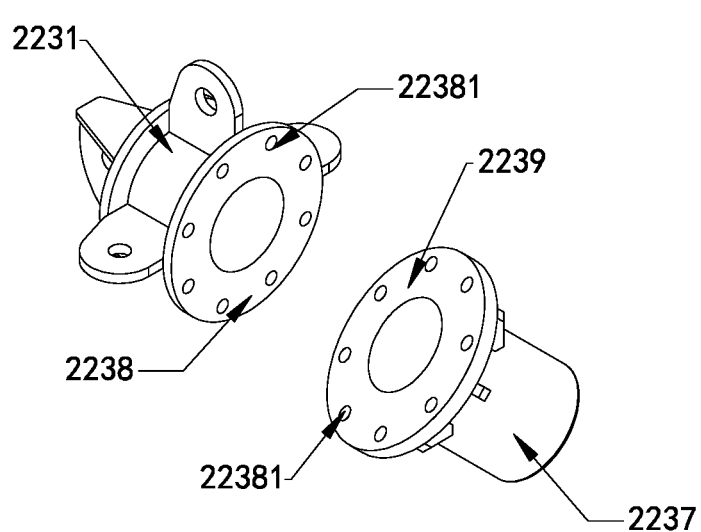
FIG. 20 is an exploded structural schematic view of the end fitting of FIG. 19.

Referring to FIGS. 19 and 20, the end fitting 2230 further includes a first flange plate 2238 and a second flange plate 2239.

The first flange plate 2238 is disposed at another end of the first flange tube 2231 away from the covering plate 2232 and is sleeved on the periphery of the first flange tube 2231.

The second flange plate 2239 is disposed at an end of the second flange tube 2237 and is sleeved on the periphery of the second flange tube 2237. The first flange plate 2238 is detachably connected to the second flange plate 2239, to realize the detachable connection between the first flange tube 2231 and the second flange tube 2237. Specifically, this configuration can indirectly increase the contact area between the first flange tube 2231 and the second flange tube 2237, thereby increasing the connection strength between the first flange tube 2231 and the second flange tube 2237.

Referring to FIG. 20, the first flange plate 2238 and the second flange plate 2239 are respectively provided with corresponding locking holes 22381, so that the first flange plate 2238 can be connected to the second flange plate 2239 by locking members (such as bolts) passing through the locking holes 22381.

In other embodiments, the first flange plate 2238 and the second flange plate 2239 may also be provided with clamping structures that match with each other, so that the first flange plate 2238 is detachably connected to the second flange plate 2239 in a clamping manner. In a word, there is no limitation on how to realize the detachable connection between the first flange plate 2238 and the second flange plate 2239.

In other embodiments, in addition to the first flange tube 2231 and the second flange tube 2237, the end fitting 2230 may further include a third flange tube, a fourth flange tube, or even more flange tubes. That is, in this case, more than two flange tubes are provided in the end fitting 2230. Moreover, in this case, a plurality of flange tubes in the end fitting 2230 are coaxially disposed, and connected in sequence. For example, the fourth flange tube, the third flange tube, the second flange tube 2237, and the first flange tube 2231 are connected in sequence, or the second flange tube 2237, the fourth flange tube, the third flange tube, and the first flange tube 2231 are connected in sequence. In addition to the smooth outer peripheral surface of the second flange tube 2237, the third flange tube, the fourth flange tube or other flange tubes can also be flange tubes with a smooth outer peripheral surface. Alternatively, the suspension insulator 2220 can be connected to the third flange tube, the fourth flange tube or other flange tubes, in addition to the first flange tube 2231.

In addition, when the end fitting 2230 further includes the third flange tube, the fourth flange tube or even more flange tubes, the connection between two adjacent flange tubes can be the same as the connection between the first flange tube 2231 and the second flange tube 2237. For example, two adjacent flange tubes can be detachably connected to each other. Two adjacent flange tubes can be detachably connected to each other through flange plates sleeved on their respective ends. The two flange plates that are detachably connected to each other are respectively provided with lock holes 22381 that match with each other, so that the two adjacent flange plates can be connected to each other by the locking member passing through the lock holes 22381.

Figure 21:
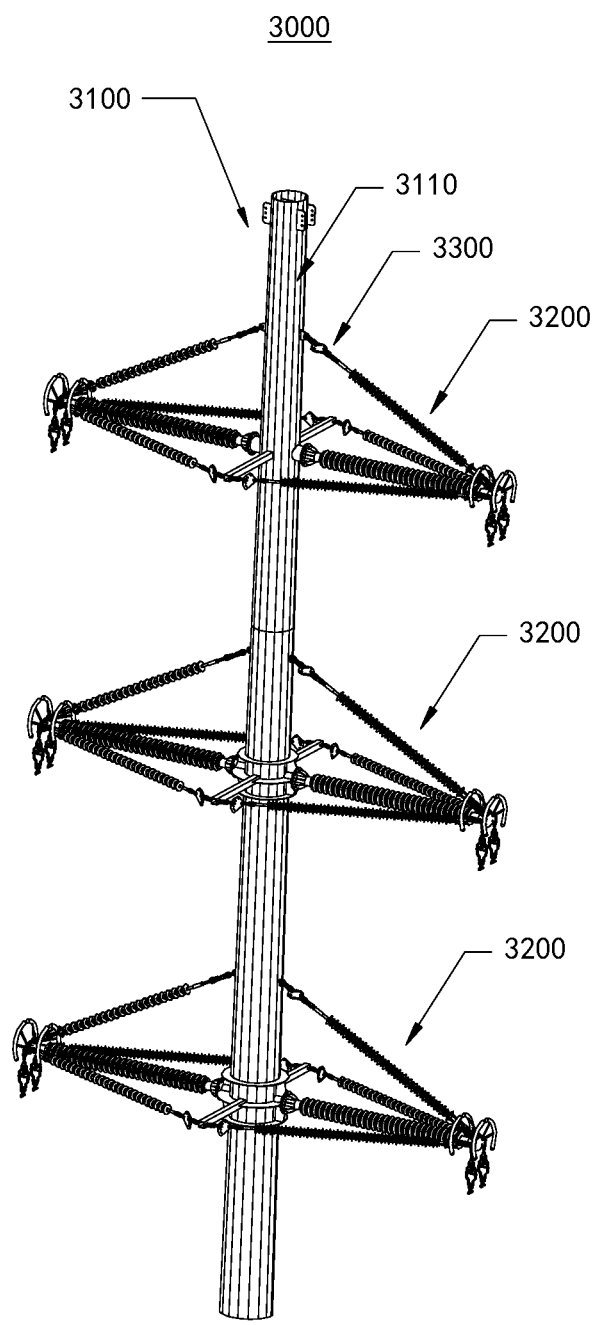
FIG. 21 is a structural schematic view of a power transmission tower according to another embodiment.
Figure 22:
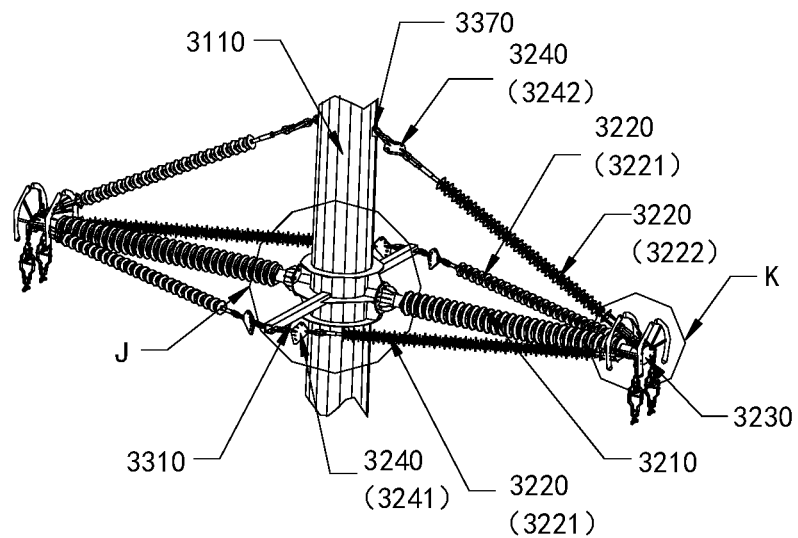
FIG. 22 is a partial structural schematic view of FIG. 21.

Referring to FIGS. 21 and 22, FIG. 21 is a structural schematic diagram of a power transmission tower according to another embodiment of the present disclosure, and FIG. 22 is a partial structural schematic view of FIG. 21. Unlike the above embodiments, a tower body 3100 according to this embodiment includes a tower pole 3110. Ends of a post insulator 3210 and suspension insulators 3220 in a composite crossarm 3200 are all connected to the tower pole 3110.

The tower pole 3110 may be a steel tube pole, or a hollow pole or a solid pole made of other materials such as composite materials, iron, alloys, which is not limited herein.

Figure 23:
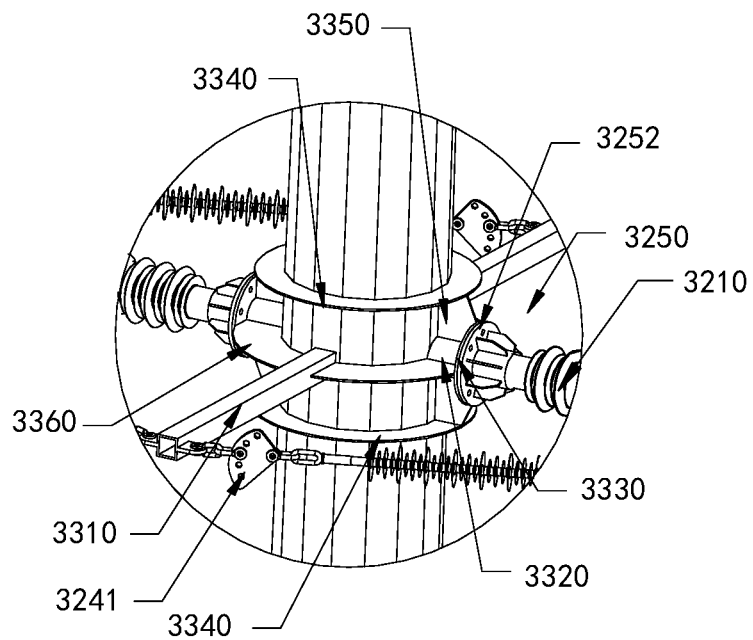
FIG. 23 is an enlarged schematic view of a portion J in FIG. 22.

In order to mount the composite crossarm 3200 on the tower pole 3110, referring to FIG. 23, a power transmission tower 3000 further includes a crossarm link fitting 3300. The crossarm link fitting 3300 connects an end of the post insulator 3210 that is not connected to the suspension insulator 3220 and an end of the suspension insulator 3220 that is not connected to the post insulator 3210, to the tower pole 3110, such that the composite crossarm 3200 is mounted on the tower body 3100, in particular, on the tower pole 3110.

The crossarm link fitting 3300 includes a connecting rod 3310, a tower flange tube 3320, and a tower flange plate 3330.

In this embodiment, three suspension insulators 3220 are provided, in which two suspension insulators 3220 whose axes are in the same plane as an axis of the post insulator 3210 are both defined as first suspension insulators 3221, and the remaining suspension insulators 3220 is defined as a second suspension insulator 3222. Distances from the second suspension insulator 3222 to the two first suspension insulators 3221 are the same.

For the convenience of description, a suspension link fitting 3240 connecting the tower pole 3110 and the first suspension insulators 3221 is defined as a first suspension link fitting 3241, and a suspension link fitting 3240 connecting the tower pole 3110 and the second suspension insulator 3222 is defined as a second suspension link fitting 3242.

Two connecting rods 3310 are provided. The two connecting rods 3310 respectively connect the two first suspension insulators 3221 and the tower pole 3110. That is, the first suspension link fitting 3241 connected to the end of the first suspension insulator 3221 is connected to the connecting rod 3310. An end of the tower flange tube 3320 is connected to the tower pole 3110. The tower flange plate 3330 covers an end of the tower flange tube 3320 away from the tower pole 3110, and is connected to the post insulator 3210.

In an application scenario, as shown in FIGS. 22 and 23, the two connecting rods 3310 are provided perpendicular to the tower pole 3110, and heights of the two connecting rods 3310 with respect to the tower pole 3110 are the same.

Of course, in other application scenarios, the two connecting rods 3310 may not be provided perpendicular to the tower pole 3110. Alternatively, the heights of the two connecting rods 3310 with respect to the tower pole 3110 may also be different. The specific configuration of the two connecting rods 3310 can be determined by the structure of the composite crossarm 3200, which is no limited herein.

In another application scenario, the two connecting rods 3310 and the tower flange tube 3320 are all fixed to the tower pole 3110 by welding, or can also be fixed in other forms, which are not limited herein.

In addition, unlike the above-mentioned embodiments, as shown in FIGS. 22 and 23, the tower flange plate 3330 of the crossarm link fitting 3300 is butted with an end flange plate 3252 of a post link fitting 3250 to mount the post insulator 3210.

Continuing to refer to FIGS. 22 and 23, the crossarm link fitting 3300 further includes a reinforcing ring 3340 and a reinforcing rib 3350.

The reinforcing ring 3340 is sleeved on the periphery of the tower pole 3110. Two ends of the reinforcing rib 3350 are connected to the reinforcing ring 3340 and the tower flange tube 3320 respectively, and side wall of the reinforcing rib 3350 is attached to the tower pole 3110, which further increases a contact area between the tower flange tube 3320 and the tower pole 3110, ensuring the connection strength between the tower flange tube 3320 and the tower pole 3110.

One or two reinforcing rings 3340 can be provided. When two reinforcing rings 3340 are provided, as shown in FIG. 23, the two reinforcing rings 3340 are provided at opposite sides of a part where the tower flange tubes 3320 are provided oppositely. For the tower flange tube 3320, the tower flange tube 3320 is connected to the two reinforcing rings 3340 through two reinforcing ribs 3350, respectively.

Continuing to refer to FIGS. 22 and 23, the crossarm link fitting 3300 further includes a reinforcing plate 3360. Two ends of the reinforcing plate 3360 are respectively connected to the connecting rod 3310 and the tower flange tube 3320, and one side wall of the reinforcing plate 3360 is attached to the tower pole 3110, thereby indirectly increasing the contact area between the connecting rod 3310, the tower flange tube 3320 and the tower pole 3110, ensuring the connection strength between the connecting rod 3310, the tower flange tube 3320 and the tower pole 3110.

In order to further increase the connection strength between the connecting rod 3310 and the tower flange tube 3320, the connecting rod 3310 can also be connected to the reinforcing ring 3340 through the reinforcing rib 3350. In this case, the reinforcing rib 3350 connecting the reinforcing ring 3340 and the connecting rod 3310 is provided in the same manner as the reinforcing rib 3350 connecting the reinforcing ring 3340 and the tower flange tube 3320, which can refer to the above for details, and will not be repeated herein.

Figure 24:
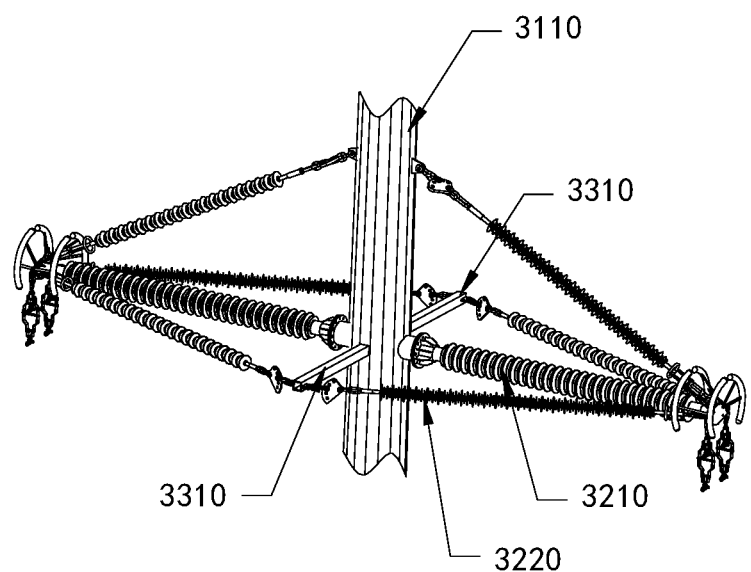
FIG. 24 is a partial structural schematic view of FIG. 21.

It should be noted that both of, either of, or neither of the reinforcing ring 3360 and the reinforcing ring 3340 may be provided (referring to FIGS. 21 and 24 for details).

In addition, the reinforcing rings 3340, the reinforcing rib 3350 and the reinforcing plate 3360 can all be fixedly connected to the two connecting rods 3310 and the tower flange tube 3320 by welding, etc., to form the crossarm link fitting 3300. Of course, the crossarm link fitting 3300 can also be provided in one piece, and which is not limited herein.

Continuing to refer to FIG. 22, the crossarm link fitting 3300 further includes a connecting lug 3370. The connecting lug 3370 is fixed on the tower pole 3110. The connecting lug 3370 can be fixed to the tower pole 3110 in the same way as the connecting rod 3310 and the tower flange tube 3320 being fixing to the tower pole 3110, which will not be repeated herein.

The suspension link fitting 3240 (the second suspension link fitting 3242) connected to the end of the second suspension insulator 3222 is connected to the connecting lug 3370. Specifically, the second suspension link fitting 3242 is connected to the connecting lug 3370 by a U-shaped ring. The connecting lug 3370 is a thin plate, and provided with connecting holes. When the U-shaped ring and the second suspension link fitting 3242 are connected to each other and locked by fasteners, the fasteners also pass through the connecting holes on the connecting lug 3370 to achieve locking and fixing. In other embodiments, the second suspension link fitting 3242 can also be connected to the tower pole 3110 through the connecting rod 3310, which is not limited herein.

Figure 25:
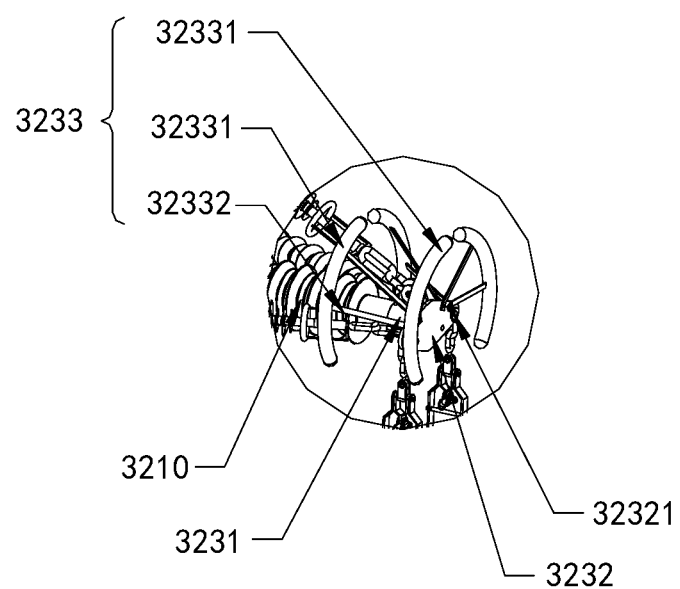
FIG. 25 is an enlarged schematic view of a portion K in FIG. 22.

In an application scenario, as shown in FIGS. 22 and 25, both another end of the post insulator 3210 and another end of the suspension insulators 3220 that are not connected to the tower body 3100 are connected to each other by an end fitting 3230. The end fitting 3230 includes a flange tube 3231, a covering plate 3232 and a link plate. The flange tube 3231 has a hollow structure along an axial direction thereof, and is used to be sleeved on the end of the post insulator 3210, specifically, sleeved on the end of the insulating body (not shown in figures) in the post insulator 3210. The covering plate 3232 is a polygonal plate. The covering plate 3232 covers an end of the flange tube 3231 to ensure that the post insulator 3210 inside the flange tube 3231 is not corroded by external moisture, etc., so as to ensure the service life of the post insulator 3210. The link plate is provided at the periphery of the flange tube 3231 and is connected to the flange tube 3231, and is used to be connected to the suspension insulator 3220.

In order to prevent the end fitting 3230 from being corroded by moisture, etc., the surface of the end fittings 3230 is hot-dip galvanized, and the end fitting 3230 can be made of cast aluminum, cast iron or alloy steel, which is not limited herein.

In addition, the various parts of the end fitting 3230 can be connected to each other by welding or the like.

Continuing to refer to FIG. 25, the covering plate 3232 is provided with a wire attaching portion 32321 that can be used to attach the transmission line. Specifically, a wire clamp used for connecting the transmission line is mounted on the wire attaching portion 32321, so as to attach the transmission line. One, two, four or even more wire attaching portions 32321 can be provided, which is not limited herein. When a plurality of the wire attaching portions 32321 are provided, a plurality of wire clamps connected to the same transmission line can be mounted on the plurality of wire attaching portions 32321 respectively, such that when one of the wire clamps is damaged, it can still be ensured that the transmission line is safely attached.

In an application scenario, as shown in FIG. 25, the wire attaching portion 32321 is a wire attaching through-hole 32321. The covering plate 3232 is provided with two wire attaching through-holes 32321 on two sides away from the flange tube 3231. The wire clamps are mounted on the two wire attaching through-holes 32321 respectively, to attach the transmission line.

Figure 26:
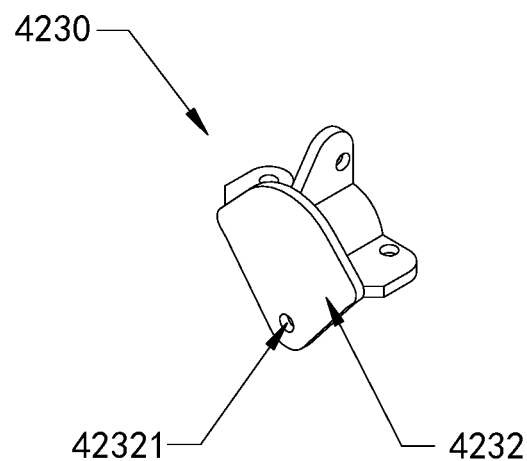
FIG. 26 is a structural schematic view of an ending fitting according to an embodiment of the present disclosure.

In other application scenarios, as shown in FIG. 26, an end fitting 4230 has a structure similar to the end fittings 3230, except that one wire attaching through-hole 42321 on a covering plate 4232 is provided. The wire attaching through-hole 42321 is located in a middle and lower part of the covering plate 4232, and a wire clamp is mounted on the wire attaching through-hole 42321 to attach the transmission line. Continuing to refer to FIG. 25, the end fitting 3230 is further provided with a grading ring 3233. The grading ring 3233 includes two sets of ring members 32331 that are provided opposite to each other and a connecting member 32332. The connecting member 32332 fixedly connects the ring member 32331 and the end fitting 3230. Specifically, the ring member 32331 is an arc-shaped metal tube member, the connecting member 32332 includes a plurality of metal plates. An end of the connecting member 32332 is connected to an inner side of the ring member 32331, by welding or fastening. Another end of the connecting member 32332 is connected to the end fitting 3230, specifically fixedly connected to the covering plate 3232, by welding or fastening. As such, the ring member 32331 forms the grading ring 3233 around the end fitting 3230.

Figure 27:
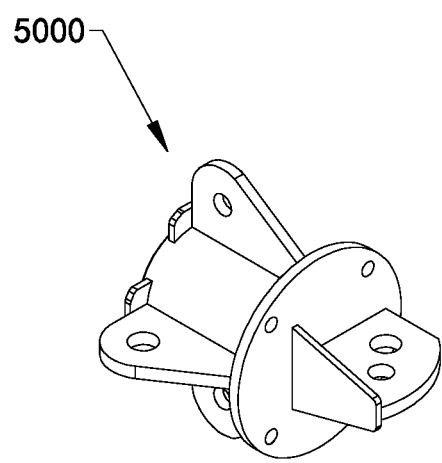
FIG. 27 is a structural schematic view of an ending fitting according to another embodiment of the present disclosure.

Referring to FIG. 27, the present disclosure further provides an end fitting 5000. The end fitting 5000 has the same structure as the end fitting 1230 according to the foregoing embodiments. For details, reference may be made to the foregoing embodiments, which will not be repeated herein.

Figure 28:
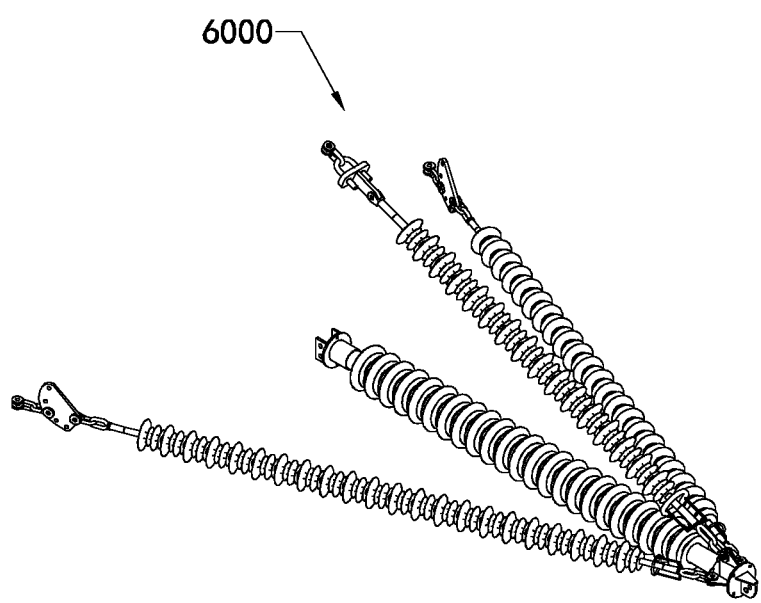
FIG. 28 is a structural schematic view of a composite crossarm according to an embodiment of the present disclosure.

Referring to FIG. 28, the present disclosure further provides a composite crossarm 6000. The composite crossarm 6000 has the same structure as the composite crossarm 1200 according to the foregoing embodiments. For details, reference may be made to the foregoing embodiments, which will not be repeated herein.

The above are only implementations of this disclosure, and do not limit the scope of this disclosure. Any equivalent structure or equivalent process variants made using the content of the specification and drawings of this disclosure, or directly or indirectly applied to other related technologies, are included in the scope of patent protection of this disclosure.

What is claimed is:

1. A composite crossarm, comprising a post insulator and three suspension insulators, wherein the post insulator and the suspension insulators each has an end configured to be connected to a tower body of a power transmission tower, and another end connected together to form an end of the composite crossarm that is configured to attach a transmission line;

wherein the three suspension insulators are arranged at intervals around the post insulator, axes of the two suspension insulators and an axis of the post insulator are in the same plane, the two suspension insulators whose axes are in the same plane as the axis of the post insulator are defined as first suspension insulators, and the remaining suspension insulator is defined as a second suspension insulator; and wherein the two first suspension insulators form an angle ranged from 45° to 90°, and the second suspension insulator and the post insulator form an angle ranged from 25° to 45°;

wherein the post insulator includes:
an insulating body;
a shed covering a periphery of the insulating body;
a post link fitting connected to an end of the insulating body to mount the post insulator on the tower body, the post link fitting including:
an end flange tube having a hollow structure along an axial direction thereof, and sleeved on the end of the insulating body;
an end flange plate covering an end of the end flange tube away from the insulating body; and
a first mounting plate, an end of the first mounting plate abutting against a plate surface of the end flange plate away from the end flange tube, the first mounting plate being configured to be connected to the tower body to mount the post insulator;
wherein two first mounting plates are provided, and the two first mounting plates are perpendicular to the end flange plate.

2. The composite crossarm according to claim 1, further comprising first suspension link fittings configured to connect the tower body and the first suspension insulators, wherein the first suspension link fitting includes:

a first sub-link fitting connected to the first suspension insulator; and
a second sub-link fitting, having an end adjustably connected to the first sub-link fitting, and another end configured to connect the tower body, such that the first suspension insulator is connected to the tower body.

3. The composite crossarm according to claim 2, wherein the first sub-link fitting is provided with a plurality of first mounting portions arranged in an arc shape, the second sub-link fitting is selectively connected to one of the first mounting portions.

4. The composite crossarm according to claim 1, further comprising a second suspension link fitting, wherein the second suspension link fitting is configured to connect the tower body and the second suspension insulator, and has a fixed length.

5. The composite crossarm according to claim 1, wherein the insulating body is a solid insulating core, or wherein the insulating body is a hollow insulating tube, insulating gas is sealed in the hollow insulating tube, and an absolute pressure value of the insulating gas is in a range from 0.1 Mpa to 0.15 Mpa.

6. The composite crossarm according to claim 1, wherein the shed includes a plurality of identical shed bodies arranged at intervals, the shed bodies are symmetrical with respect to a radial direction of the insulating body.

7. The composite crossarm according to claim 1, wherein the another end of the post insulator is connected with the another end of the suspension insulator through an end fitting, the end fitting includes:

a first flange tube having a hollow structure along an axial direction thereof, and configured to be sleeved on an end of the post insulator;
a covering plate covering an end of the first flange tub; and
an attachment plate, provided at a side of the covering plate away from the first flange tube, connected to the covering plate, and configured to attach the transmission line.

8. The composite crossarm according to claim 7, wherein the end fitting further comprises:

a connecting plate, disposed on a periphery of the first flange tube, connected to the first flange tube, and configured to be connected to the suspension insulator.

9. The composite crossarm according to claim 7, wherein the end fitting further includes:

a second flange tube having a hollow structure along an axial direction thereof, provided coaxially with the first flange tube, and connected to another end of the first flange tube away from the covering plate, wherein an outer peripheral surface of the second flange tube is smooth.

10. The composite crossarm according to claim 9, wherein the first flange tube is detachably connected to the second flange tube.

11. A power transmission tower comprising a tower body and the composite crossarm according to claim 1, connected to the tower body.

* * * * *